United States Patent
Gulati et al.

(10) Patent No.: US 11,259,311 B2
(45) Date of Patent: Feb. 22, 2022

(54) PRIORITIZATION SCHEME FOR A DECENTRALIZED CHANNEL ACCESS MECHANISM

(71) Applicant: QUALCOMM Incorporated, San Diego, CA (US)

(72) Inventors: Kapil Gulati, Hillsborough, NJ (US); Junyi Li, Chester, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/595,780

(22) Filed: Oct. 8, 2019

(65) Prior Publication Data

US 2020/0146024 A1  May 7, 2020

Related U.S. Application Data

(60) Provisional application No. 62/754,431, filed on Nov. 1, 2018.

(51) Int. Cl.
*H04W 72/10* (2009.01)
*H04W 72/04* (2009.01)

(52) U.S. Cl.
CPC ......... *H04W 72/10* (2013.01); *H04W 72/044* (2013.01)

(58) Field of Classification Search
None
See application file for complete search history.

(56) References Cited

U.S. PATENT DOCUMENTS

2008/0175265 A1* 7/2008 Yonge .................. H04B 3/54
370/447
2018/0288785 A1* 10/2018 Guo ..................... H04W 28/16

OTHER PUBLICATIONS

International Search Report and Written Opinion—PCT/US2019/055358—ISA/EPO—dated Jan. 3, 2020.
Ma Y., "Analysis of Channel Access Priority Classes in LTE-LAA Spectrum Sharing System", 2018 27th International Conference on Computer Communication and Networks (ICCCN), IEEE, Jul. 30, 2018 (Jul. 30, 2018), pp. 1-7, XP033416600, DOI: 10.1109/ICCCN.2018.8487443 [retrieved on Oct. 9, 2018] figures 1,2, sections I-VI.

(Continued)

*Primary Examiner* — Chi H Pham
*Assistant Examiner* — Raul Rivas
(74) *Attorney, Agent, or Firm* — Harrity & Harrity, LLP (57) ABSTRACT

Various aspects of the present disclosure generally relate to wireless communication. In some aspects, a wireless communication device may determine an earliest slot, of a window in which a communication is to be transmitted, in which the wireless communication device is permitted to transmit the communication, wherein the earliest slot is determined based at least in part on a priority level of the communication; and map the communication to a resource based at least in part on the earliest slot and based at least in part on which resources, of the earliest slot, are occupied resources associated with another communication having a higher priority level than the communication. Numerous other aspects are provided.

30 Claims, 5 Drawing Sheets

(56) References Cited

OTHER PUBLICATIONS

Samsung: "Channel Access Procedures for NR-U", 3GPP TSG-RAN WG1 Meeting #94bis, 3GPP Draft; R1-1810860-Channel Access Procedures for NR-U, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 29, 2018, (Sep. 29, 2018), 9 Pages, XP051518265, Retrieved from the Internet: URL: http://www.3gpp.org/ftp/tsg%5Fran/WG1%5FRL1/TSGR1%5F94b/Docs/R1%2D1810860%2Ezip [retrieved on Sep. 29, 2018] figures 1-7, sections 2-9.

\* cited by examiner

PRIORITIZATION SCHEME FOR A DECENTRALIZED CHANNEL ACCESS MECHANISM

CROSS-REFERENCE TO RELATED APPLICATION

This application claims priority to Provisional Patent Application No. 62/754,431, filed on Nov. 1, 2018, entitled "PRIORITIZATION SCHEME FOR A DECENTRALIZED CHANNEL ACCESS MECHANISM," which is hereby expressly incorporated by reference herein.

FIELD OF THE DISCLOSURE

Aspects of the present disclosure generally relate to wireless communication, and more particularly to techniques and apparatuses for a prioritization scheme for a decentralized channel access mechanism.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include determining an earliest slot, of a window in which a communication is to be transmitted, in which the wireless communication device is permitted to transmit the communication, wherein the earliest slot is determined based at least in part on a priority level of the communication; and mapping the communication to a resource based at least in part on the earliest slot and based at least in part on which resources, of the earliest slot, are occupied resources associated with another communication having a higher priority level than the communication.

In some aspects, a wireless communication device for wireless communication may include memory and one or more processors operatively coupled to the memory. The memory and the one or more processors may be configured to determine an earliest slot, of a window in which a communication is to be transmitted, in which the wireless communication device is permitted to transmit the communication, wherein the earliest slot is determined based at least in part on a priority level of the communication; and map the communication to a resource based at least in part on the earliest slot and based at least in part on which resources, of the earliest slot, are occupied resources associated with another communication having a higher priority level than the communication.

In some aspects, a non-transitory computer-readable medium may store one or more instructions for wireless communication. The one or more instructions, when executed by one or more processors of a wireless communication device, may cause the one or more processors to: determine an earliest slot, of a window in which a communication is to be transmitted, in which the wireless communication device is permitted to transmit the communication, wherein the earliest slot is determined based at least in part on a priority level of the communication; and map the communication to a resource based at least in part on the earliest slot and based at least in part on which resources, of the earliest slot, are occupied resources associated with another communication having a higher priority level than the communication.

In some aspects, an apparatus for wireless communication may include means for determining an earliest slot, of a window in which a communication is to be transmitted, in which the apparatus is permitted to transmit the communication, wherein the earliest slot is determined based at least in part on a priority level of the communication; and means for mapping the communication to a resource based at least in part on the earliest slot and based at least in part on which resources, of the earliest slot, are occupied resources associated with another communication having a higher priority level than the communication.

In some aspects, a method of wireless communication, performed by a wireless communication device, may include determining a window in which a communication is to be transmitted, wherein the communication is associated with a priority level; determining an earliest slot, of the window, in which the wireless communication device is permitted to transmit the communication, wherein the earliest slot is determined based at least in part on the priority level; and mapping the communication to a resource based at least in part on the earliest slot and based at least in part on which resources, of the earliest slot, are occupied resources associated with another communication having a higher priority level.

In some aspects, a wireless communication device for wireless communication may include memory and one or more processors operatively coupled to the memory. The memory and the one or more processors may be configured to determine a window in which a communication is to be transmitted, wherein the communication is associated with a priority level; determine an earliest slot, of the window, in which the wireless communication device is permitted to transmit the communication, wherein the earliest slot is determined based at least in part on the priority level; and map the communication to a resource based at least in part on the earliest slot and based at least in part on which resources, of the earliest slot, are occupied resources associated with another communication having a higher priority level.

In some aspects, a non-transitory computer-readable medium may store one or more instructions for wireless communication. The one or more instructions, when executed by one or more processors of a wireless communication device, may cause the one or more processors to determine a window in which a communication is to be transmitted, wherein the communication is associated with a priority level; determine an earliest slot, of the window, in which the wireless communication device is permitted to transmit the communication, wherein the earliest slot is determined based at least in part on the priority level; and map the communication to a resource based at least in part on the earliest slot and based at least in part on which resources, of the earliest slot, are occupied resources associated with another communication having a higher priority level.

In some aspects, an apparatus for wireless communication may include means for determining a window in which a communication is to be transmitted, wherein the communication is associated with a priority level; means for determining an earliest slot, of the window, in which the apparatus is permitted to transmit the communication, wherein the earliest slot is determined based at least in part on the priority level; and means for mapping the communication to a resource based at least in part on the earliest slot and based at least in part on which resources, of the earliest slot, are occupied resources associated with another communication having a higher priority level.

Aspects generally include a method, apparatus, system, computer program product, non-transitory computer-readable medium, user equipment, base station, wireless communication device, and processing system as substantially described herein with reference to and as illustrated by the accompanying drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
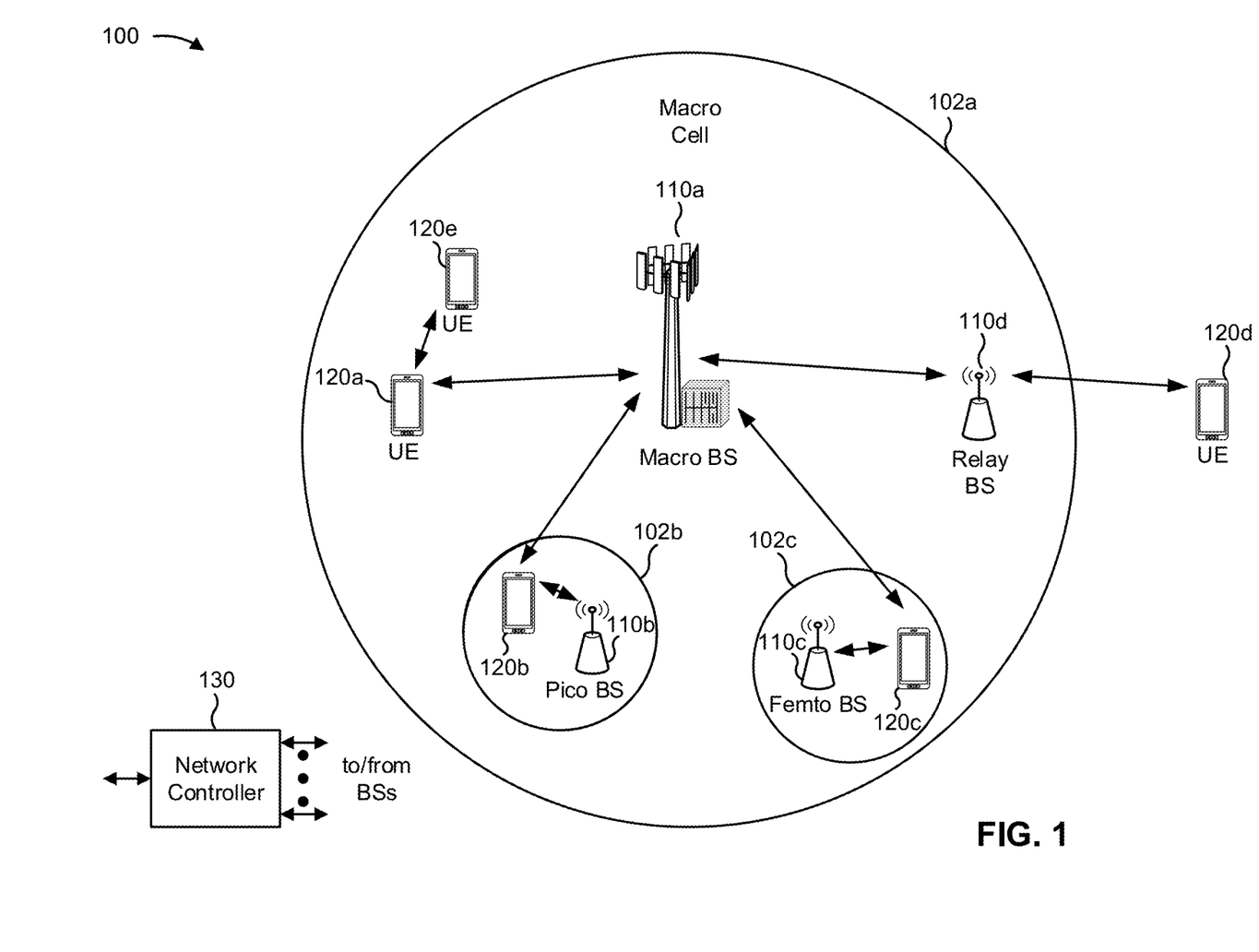
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
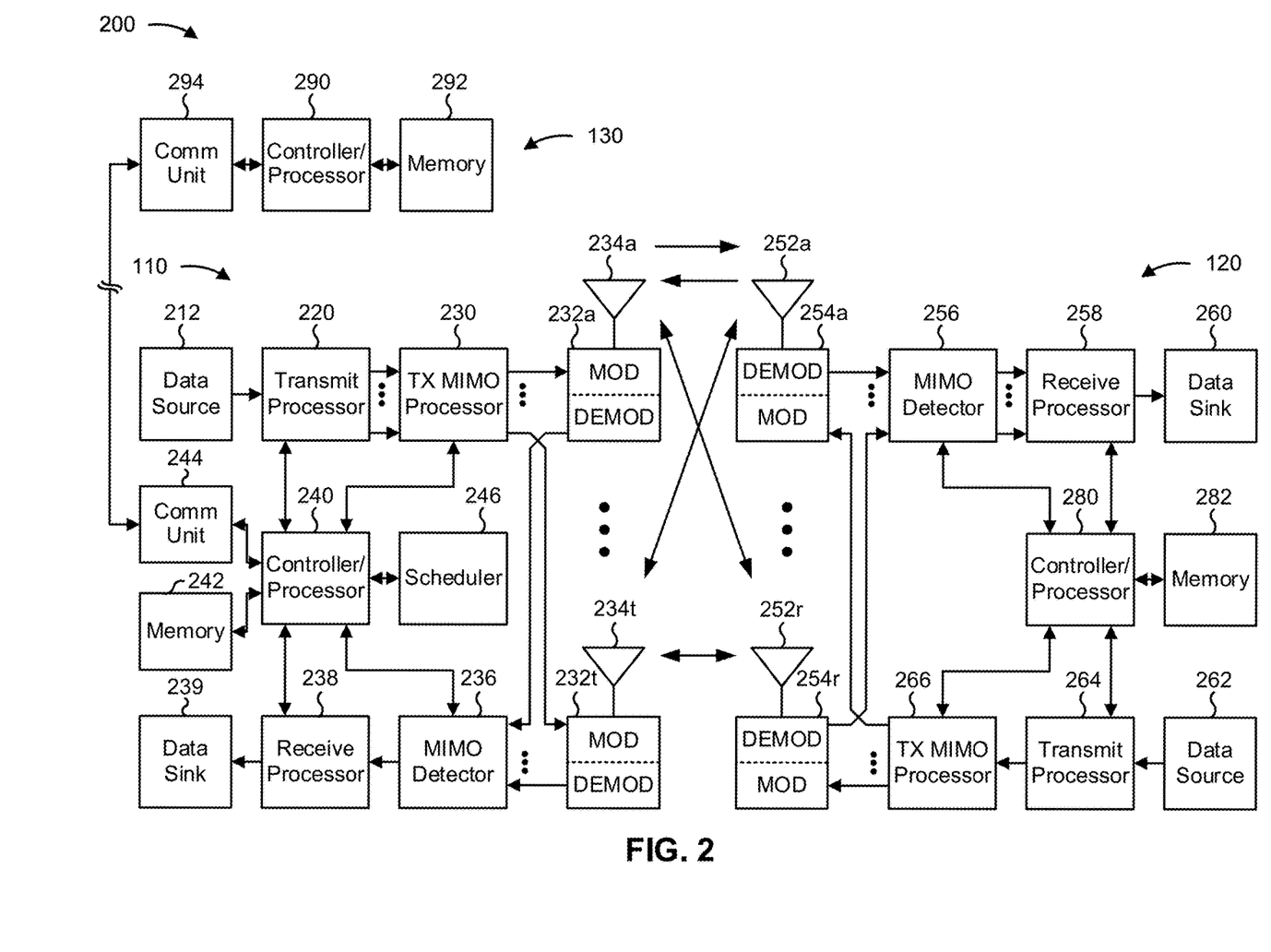
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a prioritization scheme for a decentralized channel access mechanism, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a window in which a communication is to be transmitted, wherein the communication is associated with a priority level; means for determining an earliest slot, of the window, in which the wireless communication device is permitted to transmit the communication, wherein the earliest slot is determined based at least in part on the priority level; means for mapping the communication to a resource based at least in part on the earliest slot and based at least in part on which resources, of the earliest slot, are occupied resources associated with another communication having a higher priority level; means for identifying the occupied resources based at least in part on the other communication, wherein the other communication at least partially occurs in an earlier slot or window than the earliest slot or the window; means for transmitting the communication on the resource; and/or the like. In some aspects, such means may include one or more components of UE 120 described in connection with FIG. 2.

As indicated above, FIG. 2 is provided merely as an example. Other examples may differ from what is described with regard to FIG. 2.

Some network deployments may use a distributed channel access mechanism, wherein a central scheduler does not perform scheduling for a channel. Examples of distributed channel access mechanisms include random resource selection, listen-before-talk (LBT) based resource selection, request-response based resource selection (e.g., with transmit/receive yielding based at least in part on a request and a corresponding response), long-term sensing-based resource selection, and/or the like. These distributed channel access mechanisms may provide mechanisms for channel access within a slot, and are therefore referred to herein as slot-based distributed channel access mechanisms.

Each distributed channel access mechanism may have a chance of collision between two or more transmissions. The probability of a collision may depend on the channel access mechanism. For example, random resource selection may result in the highest collision probability of the above distributed channel access mechanisms, but may be associated with less overhead than the other distributed channel access mechanisms (e.g., due to the lack of contention communications). As another example, an LBT-based access mechanism may create guard zones around transmitters, so for a typical receiver, the probability of collision is less than that of a random resource selection mechanism.

Different distributed channel access network deployments, or even UEs within a distributed channel access network deployment, may use different channel access mechanisms (e.g., random resource selection, LBT, request-response, and/or the like). Furthermore, some priority systems for communication in a distributed channel access network deployment focus on ensuring that latency requirements are met. However, in some cases, reliability may be more important than latency, such as when a latency in a mechanical reaction to a communication is larger than a latency in the communication.

Some techniques and apparatuses described herein provide a reliability-focused priority system for a distributed channel access mechanism. For example, some techniques and apparatuses described herein may use a priority contention window that includes a plurality of slots that are each associated with a respective priority level. In some aspects, the priority level may be in descending order starting with a first slot of the plurality of slots. A UE may determine an earliest slot in which a communication can be transmitted based at least in part on a priority level of the communication. The UE may then identify resources of the earliest slot that are unavailable for various reasons, as described in more detail below. The UE may map the communication to a resource of the earliest slot (when sufficient resources are available) or to a later slot (when sufficient resources of the earliest slot are not available, or when a collision with a lower-priority communication is acceptable). This priority system may be compatible with, and/or may be applied in conjunction with, the slot-based distributed channel access mechanisms described above (e.g., LBT, request-response, random resource selection, and/or the like). In this way, reliability requirements for communications may be satisfied while allowing slot-based distributed channel access mechanisms to be performed. For example, using an approach wherein a communication can be mapped to an earliest permitted slot, or to a later slot, may increase the likelihood that a suitable slot can be found for the communication, thereby improving reliability of the communication.

Figure 3:
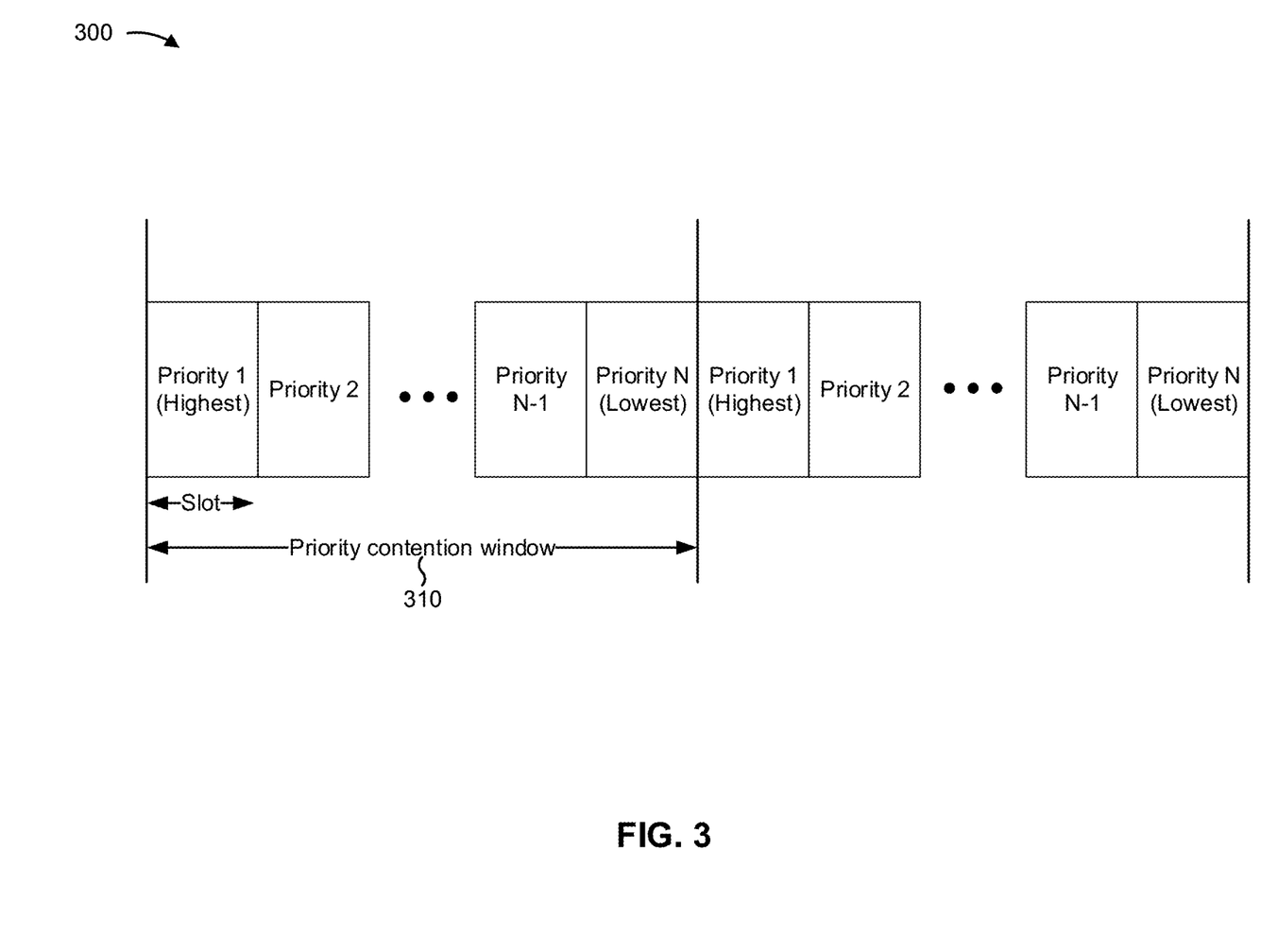
FIG. 3 is a diagram illustrating an example of a set of priority contention windows for a reliability-focused priority system for a distributed channel access mechanism, in accordance with various aspects of the present disclosure.

FIG. 3 is a diagram illustrating an example 300 of a set of priority contention windows for a reliability-focused priority system for a distributed channel access mechanism, in accordance with various aspects of the present disclosure. As shown in FIG. 3, and by reference number 310, a set of slots may be included in a priority contention window. In some cases, a priority contention window may be referred to herein as a window. Each slot may include a set of time resources (e.g., symbols) and a set of frequency resources (e.g., tones, subcarriers, bandwidth parts, and/or the like). As one example, each slot may include 14 symbols. In some aspects, a resource may be referred to as a time-frequency resource (TF resource), which may refer to a particular symbol or set of symbols and a particular frequency or set of frequencies. In example 300, there are N slots, corresponding to N possible priority levels for communications to be transmitted using the distributed channel access mechanism.

In some aspects, a slot may be associated with multiple priority levels. For example, a first slot may be associated with a priority level of 1, and a second slot may be associated with priority levels of 2 and 3. In some aspects, different contention windows may have slots with different combinations of priority levels. For example, a first priority contention window may include even priority level slots, and a second priority contention window may include odd priority level slots. As another example, all priority contention windows of a set of priority contention windows may include a highest priority level slot, and a lower priority level slot may be included in less than all priority contention windows of the set of priority contention windows.

To transmit a communication in accordance with the priority system, a wireless communication device (e.g., UE 120, BS 110, and/or the like) may determine a priority level of the communication. The wireless communication device may determine a priority contention window within which the wireless communication device is to transmit the communication. For example, the wireless communication device may determine the priority contention window as a current priority contention window (e.g., when a slot corresponding to the priority level of the communication has not yet occurred), as a next priority contention window (e.g., when a slot corresponding to the priority level of the communication has already occurred) or as another priority contention window (e.g., based at least in part on traffic conditions, channel conditions, and/or the like).

The wireless communication device may determine an earliest slot, within the priority contention window, in which the wireless communication device is permitted to transmit the communication. For example, the wireless communication device may identify an earliest slot corresponding to the priority level of the communication. As a more particular example, if the communication is associated with a priority level of 2, the wireless communication device may identify the slot in the priority contention window that has the priority level of 2 as the earliest slot.

The wireless communication device may identify resources (e.g., time resources, frequency resources, or TF resources) in the earliest time slot that are occupied resources. An occupied resource may be a resource that is reserved for another communication or that is expected to be reserved for another communication. In some aspects, the wireless communication device may identify a resource of an earliest slot as an occupied resource when the resource is used by a higher-priority communication in an earlier slot than the earliest slot (e.g., an earlier slot in the priority contention window). In some aspects, the wireless communication device may identify a resource of an earliest slot as an occupied resource when the resource is used by a communication (e.g., a higher-priority communication) in a previous priority contention window.

In some aspects, the wireless communication device may identify an occupied resource based at least in part on decoding a control transmission. For example, the wireless communication device may identify a number of slots and a resource block allocation of a communication using the control transmission. In some aspects, the wireless communication device may identify an occupied resource based at least in part on a channel measurement. For example, the wireless communication device may identify an occupied resource based at least in part on a reference signal received power (RSRP) value or another channel measurement value satisfying a threshold, indicating that the occupied resource is in use for another communication.

In some aspects, the wireless communication device may select a resource based at least in part on the earliest time slot. For example, the wireless communication device may select a resource in the earliest time slot when available resources (e.g., resources of the earliest slot other than the occupied resources of the earliest time slot) are sufficient for the communication, or may select a resource in a later time slot. In some aspects, the wireless communication device may select the resource in the later time slot when available resources of the earliest time slot are insufficient for the communication. In some aspects, the wireless communication device may select the resource in the later time slot when a collision with a lower-priority communication is acceptable (for example, when latency requirements can no longer be met if the device waits until the next priority contention window). For example, another wireless communication device that transmits the lower-priority communication may not know that the wireless communication device has selected the resource in the later time slot, since the wireless communication device did not transmit in the earliest slot. Therefore, a collision may be possible.

In some aspects, the wireless communication device may select a resource based at least in part on a slot-level decentralized channel access mechanism. For example, the wireless communication device may select a resource within a slot (e.g., the earliest slot or a later slot) based at least in part on the slot-level decentralized access mechanism. As a particular example, the wireless communication device may select the resource based at least in part on a random resource allocation technique or a pseudorandom resource allocation technique. As another example, the wireless communication device may select the resource based at least in part on an LBT technique or a request-response technique. Thus, slot-level decentralized channel access mechanisms may be used to select resources within a slot for a communication, while the reliability-focused priority system may be used to select a slot for the communication.

Figure 4:
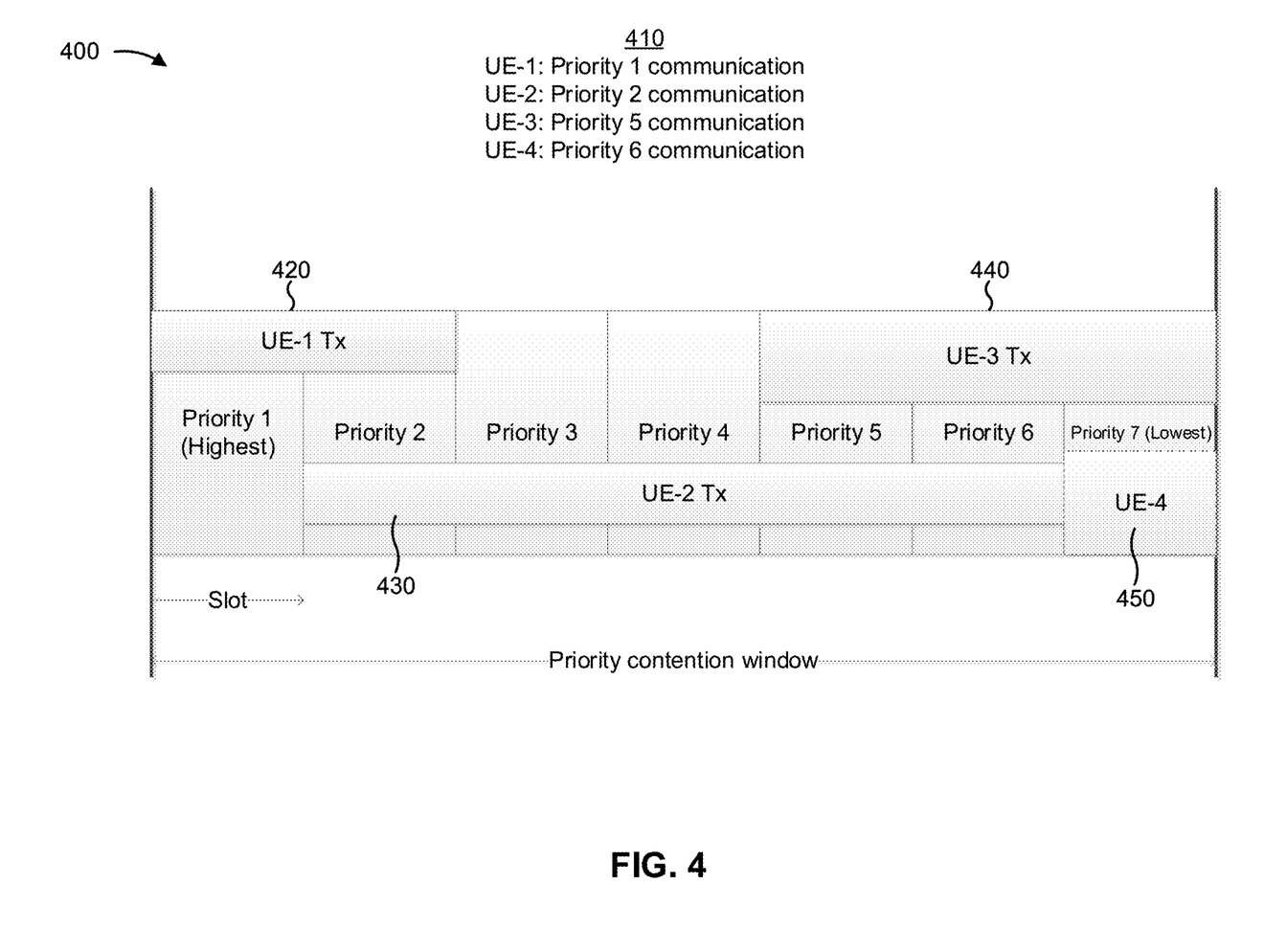
FIG. 4 is a diagram illustrating an example of selecting resources for a set of communications based at least in part on a reliability-focused priority system for a distributed channel access mechanism, in accordance with various aspects of the present disclosure.

For a more detailed example of selecting resources for communications of different priority levels by a plurality of wireless communication devices, refer to the description accompanying FIG. 4.

As indicated above, FIG. 3 is provided as an example. Other examples may differ from what is described with respect to FIG. 3.

FIG. 4 is a diagram illustrating an example 400 of selecting resources for a set of communications based at least in part on a reliability-focused priority system for a distributed channel access mechanism, in accordance with various aspects of the present disclosure. As shown, example 400 includes a priority contention window that includes 7 slots. Each slot is associated with a respective priority level, from Priority 1 (a highest priority level) to Priority 7 (a lowest priority level). The vertical axis represents frequency and the horizontal access represents time. As shown by reference number 410, a set of UEs (e.g., UE-1, UE-2, UE-3, and UE-4) (not shown in FIG. 4) may transmit communications associated with respective priority levels. Here, UE-1's communication is associated with a priority level of 1, UE-2's communication is associated with a priority level of 2, UE-3's communication is associated with a priority level of 5, and UE-4's communication is associated with a priority level of 6. While the operations described in connection with FIG. 4 are described as being performed by UEs, these operations may be performed by any wireless communication device.

Each UE may select resources for the corresponding communication in accordance with the procedure described in connection with FIG. 3. The selection of the resources is described in turn for each UE below.

As indicated above, UE-1's communication is associated with a priority level of 1. Therefore, the earliest slot in which UE-1 is permitted to transmit is the first slot (e.g., Priority 1). Therefore, UE-1 may select a resource 420 in the first slot for UE-1's communication. Here, UE-1's communication extends into the second slot (e.g., Priority 2).

As indicated above, UE-2's communication is associated with a priority level of 2. Therefore, the earliest slot in which UE-2 is permitted to transmit is the second slot. UE-2 may listen on one or more previous slots (e.g., the first slot and/or a slot associated with a previous priority contention window), may identify occupied resources of the second slot (e.g., the time/frequency resources used by UE-1's communication), and may select a resource 430 other than the occupied resource. Here, UE-2's communication extends to the sixth slot (e.g., Priority 6).

As indicated above, UE-3's communication is associated with a priority level of 5. Therefore, the earliest slot in which UE-3 is permitted to transmit is the fifth slot. UE-3 may listen on one or more previous slots (e.g., the first slot through the fourth slot and/or a slot associated with a previous priority contention window), may identify occupied resources of the fifth slot (e.g., the time/frequency resources used by UE-2's communication, since UE-1's communication has ended), and may select a resource 440 other than the occupied resource. Here, UE-3's communication extends to the seventh slot (e.g., Priority 7).

As indicated above, UE-4's communication is associated with a priority level of 6. Therefore, the earliest slot in which UE-4 is permitted to transmit is the sixth slot. However, UE-4's communication, shown by the dashed rectangle in the last slot, occupies too many resources to be transmitted using a contiguous resource allocation in the sixth slot. For example, UE-4 may determine that UE-4's communication cannot be transmitted in the sixth slot based at least in part on listening to the first slot through the fifth slot and determining occupied resources associated with UE-1, UE-2, and UE-3. In this case, UE-4 may determine to transmit on the seventh slot instead of the sixth slot (as shown by the dashed rectangle indicated by reference number 450), although this may lead to a collision with a communication of priority level 7 (since a UE transmitting the communication of priority level 7 would not know that UE-4's communication will be transmitted in the seventh frame by listening to the sixth frame). In some aspects, UE-4 may drop UE-4's communication or may postpone UE-4's communication to a next priority contention window. For example, UE-4 may postpone UE-4's communication if postponing UE-4's communication would not cause the violation of a latency requirement of UE-4's communication.

Thus, a reliability-focused priority system may allocate slots and/or resources for communications of different priority levels, irrespective of the slot-level decentralized channel access mechanisms used for the communications.

As indicated above, FIG. 4 is provided as an example. Other examples may differ from what is described with respect to FIG. 4.

Figure 5:
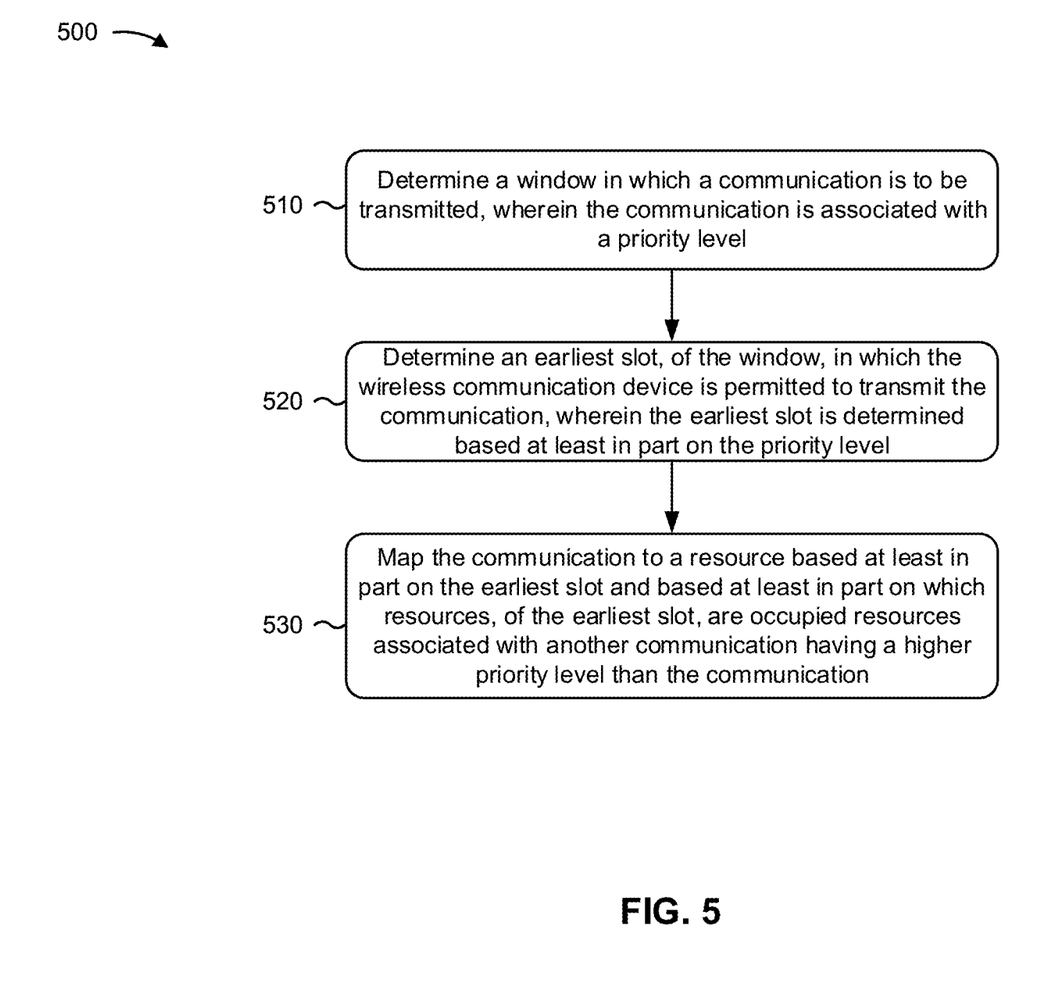
FIG. 5 is a diagram illustrating an example process performed, for example, by a wireless communication device, in accordance with various aspects of the present disclosure.

FIG. 5 is a diagram illustrating an example process 500 performed, for example, by a wireless communication device, in accordance with various aspects of the present disclosure. Example process 500 is an example where a wireless communication device (e.g., UE 120, BS 110, and/or the like) performs prioritization for a decentralized channel access mechanism.

As shown in FIG. 5, in some aspects, process 500 may include determining a window in which a communication is to be transmitted, wherein the communication is associated with a priority level (block 510). For example, the wireless communication device (e.g., using controller/processor 240, controller/processor 280 and/or the like) may determine a window (e.g., a priority contention window) in which a communication is to be transmitted (e.g., by the wireless communication device). The communication may be associated with a priority level. For example, the wireless communication device may determine the priority level (e.g., based at least in part on metadata of the communication, a header of the communication, a priority level of the wireless communication device, content of the communication, and/or the like).

As shown in FIG. 5, in some aspects, process 500 may include determining an earliest slot, of the window, in which the wireless communication device is permitted to transmit the communication, wherein the earliest slot is determined based at least in part on the priority level (block 520). For example, the wireless communication device (e.g., using controller/processor 240, controller/processor 280, and/or the like) may determine an earliest slot, of the window, in which the wireless communication device is permitted to transmit the communication. The earliest slot may be determined based at least in part on the priority level.

As shown in FIG. 5, in some aspects, process 500 may include mapping the communication to a resource based at least in part on the earliest slot and based at least in part on which resources, of the earliest slot, are occupied resources associated with another communication having a higher priority level than the communication (block 530). For example, the wireless communication device (e.g., using controller/processor 280, transmit processor 264, TX MIMO processor 266, MOD 254, antenna 252, and/or the like) may map the communication to a resource. The wireless communication device may map the communication to the resource based at least in part on the earliest slot (e.g., the communication may or may not be mapped to the earliest slot). The wireless communication device may map the communication based at least in part on which resource, of the earliest slot, are occupied resources associated with another communication having a higher priority level.

Process 500 may include additional aspects, such as any single aspect or any combination of aspects described below and/or in connection with one or more other processes described elsewhere herein.

In a first aspect, the resource is mapped in the earliest slot based at least in part on available resources of the earliest slot being sufficient for the communication. In a second aspect, alone or in combination with the first aspect, the resource is mapped in a slot after the earliest slot, and available resources of the earliest slot are sufficient for the communication.

In a third aspect, alone or in combination with the first and/or second aspects, the occupied resources are identified as occupied when corresponding resources, of the other communication, are occupied in a slot, in the window, that occurs earlier than the earliest slot. In a fourth aspect, alone or in combination with any one or more of the first through third aspects, the window includes a plurality of slots associated with respective priority levels. In a fifth aspect, alone or in combination with any one or more of the first through fourth aspects, a first slot of the plurality of slots is associated with a highest priority level of the respective priority levels.

In a sixth aspect, alone or in combination with any one or more of the first through fifth aspects, the wireless communication device (e.g., using controller/processor 280 and/or the like) may identify the occupied resources based at least in part on the other communication, wherein the other communication at least partially occurs in an earlier slot or window than the earliest slot or the window. In a seventh aspect, alone or in combination with any one or more of the first through sixth aspects, identifying the occupied resources is based at least in part on decoding a control transmission of the other communication. In an eighth aspect, alone or in combination with any one or more of the first through seventh aspects, identifying the occupied resources is based at least in part on a channel measurement with regard to the earlier slot or window.

In a ninth aspect, alone or in combination with any one or more of the first through eighth aspects, the resource occurs after the earliest slot based at least in part on available resources of the earliest slot being insufficient for the communication. In some aspects, the resource is selected based at least in part on a slot-level decentralized channel access mechanism. In a tenth aspect, alone or in combination with any one or more of the first through ninth aspects, the resource comprises at least one of a frequency resource or a time resource. In an eleventh aspect, alone or in combination with any one or more of the first through third aspects, the wireless communication device (e.g., using controller/processor 280, transmit processor 264, TX MIMO processor 266, MOD 254, antenna 252, and/or the like) may transmit the communication on the resource.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
   determining an earliest slot, of a window in which a communication is to be transmitted, in which the wireless communication device is permitted to transmit the communication,
      wherein the window includes slots, including the earliest slot, that are associated with slot priority levels,
      wherein each slot, of the slots, is associated with a different respective slot priority level of the slot priority levels,
      wherein the earliest slot is determined based at least in part on a communication priority level of the communication corresponding to a respective slot priority level, of the slot priority levels, of the earliest slot, and
      wherein the earliest slot is after an initial slot of the window; and
   mapping the communication to a resource based at least in part on the earliest slot and based at least in part on one or more resources, of the earliest slot, being occupied resources associated with another communication having a higher communication priority level than the communication.

2. The method of claim 1, wherein the resource is in the earliest slot based at least in part on available resources of the earliest slot being sufficient for the communication.

3. The method of claim 1, wherein the resource is in a slot after the earliest slot, and wherein available resources of the earliest slot are sufficient for the communication.

4. The method of claim 1, wherein the occupied resources are identified as occupied when corresponding resources, of the other communication, are occupied in a slot, in the window, that occurs earlier than the earliest slot.

5. The method of claim 1, wherein the initial slot is associated with a highest slot priority level of the slot priority levels.

6. The method of claim 1, further comprising:
   identifying the occupied resources based at least in part on the other communication,
      wherein the other communication at least partially occurs in an earlier slot or window than the earliest slot or the window.

7. The method of claim 6, wherein identifying the occupied resources is based at least in part on decoding a control transmission of the other communication.

8. The method of claim 6, wherein identifying the occupied resources is based at least in part on a channel measurement with regard to the earlier slot or window.

9. The method of claim 1, wherein the resource occurs after the earliest slot based at least in part on available resources of the earliest slot being insufficient for the communication.

10. The method of claim 1, wherein the resource is selected based at least in part on a slot-level decentralized channel access mechanism.

11. The method of claim 1, wherein the resource comprises at least one of a frequency resource or a time resource.

12. The method of claim 1, further comprising:
   transmitting the communication on the resource.

13. The method of claim 1, further comprising:
   determining the window in which the communication is to be transmitted.

14. A wireless communication device for wireless communication, comprising:
   a memory; and
   one or more processors coupled to the memory, the memory and the one or more processors configured to:
      determine an earliest slot, of a window in which a communication is to be transmitted, in which the wireless communication device is permitted to transmit the communication,
         wherein the window includes slots, including the earliest slot, that are associated with slot priority levels,
         wherein each slot, of the slots, is associated with a different respective slot priority level of the slot priority levels,
         wherein the earliest slot is determined based at least in part on a communication priority level of the communication corresponding to a respective slot priority level, of the slot priority levels, of the earliest slot, and
         wherein the earliest slot is after an initial slot of the window; and
      map the communication to a resource based at least in part on the earliest slot and based at least in part on one or more resources, of the earliest slot, being occupied resources associated with another communication having a higher communication priority level than the communication.

15. The wireless communication device of claim 14, wherein the resource is in the earliest slot based at least in part on available resources of the earliest slot being sufficient for the communication.

16. The wireless communication device of claim 14, wherein the resource is in a slot after the earliest slot, and wherein available resources of the earliest slot are sufficient for the communication.

17. The wireless communication device of claim 14, wherein the occupied resources are identified as occupied when corresponding resources, of the other communication, are occupied in a slot, in the window, that occurs earlier than the earliest slot.

18. The wireless communication device of claim 14, wherein the one or more processors are further configured to:
identify the occupied resources based at least in part on the other communication,
wherein the other communication at least partially occurs in an earlier slot or window than the earliest slot or the window.

19. The wireless communication device of claim 18, wherein identifying the occupied resources is based at least in part on decoding a control transmission of the other communication.

20. The wireless communication device of claim 18, wherein identifying the occupied resources is based at least in part on a channel measurement with regard to the earlier slot or window.

21. The wireless communication device of claim 14, wherein the resource occurs after the earliest slot based at least in part on available resources of the earliest slot being insufficient for the communication.

22. The wireless communication device of claim 14, wherein the resource is selected based at least in part on a slot-level decentralized channel access mechanism.

23. The wireless communication device of claim 14, wherein the resource comprises at least one of a frequency resource or a time resource.

24. The wireless communication device of claim 14, wherein the one or more processors are further configured to:
transmit the communication on the resource.

25. The wireless communication device of claim 14, wherein the one or more processors are further configured to:
determine the window in which the communication is to be transmitted.

26. A non-transitory computer-readable medium storing one or more instructions for wireless communication, the one or more instructions comprising:
one or more instructions that, when executed by one or more processors of a wireless communication device, cause the device to:
determine an earliest slot, of a window in which a communication is to be transmitted, in which the wireless communication device is permitted to transmit the communication,
wherein the window includes slots, including the earliest slot, that are associated with slot priority levels,
wherein each slot, of the slots, is associated with a different respective slot priority level of the slot priority levels,
wherein the earliest slot is determined based at least in part on a communication priority level of the communication corresponding to a respective slot priority level, of the slot priority levels, of the earliest slot, and
wherein the earliest slot is after an initial slot of the window; and
map the communication to a resource based at least in part on the earliest slot and based at least in part on one or more resources, of the earliest slot, being occupied resources associated with another communication having a higher communication priority level than the communication.

27. An apparatus for wireless communication, comprising:
means for determining an earliest slot, of a window in which a communication is to be transmitted, in which the apparatus is permitted to transmit the communication,
wherein the window includes slots, including the earliest slot, that are associated with slot priority levels,
wherein each slot, of the slots, is associated with a different respective slot priority level of the slot priority levels,
wherein the earliest slot is determined based at least in part on a communication priority level of the communication corresponding to a respective slot priority level, of the slot priority levels, of the earliest slot, and
wherein the earliest slot is after an initial slot of the window; and
means for mapping the communication to a resource based at least in part on the earliest slot and based at least in part on one or more resources, of the earliest slot, being occupied resources associated with another communication having a higher communication priority level than the communicat ion.

28. The method of claim 1, wherein the slots are ordered in descending slot priority levels from the initial slot of the window associated with a highest slot priority level to a last slot of the window associated with a lowest slot priority level.

29. The wireless communication device of claim 14, wherein a slot, of the slots, is associated with multiple slot priority levels and another slot of the slots, is associated with a single slot priority level.

30. The apparatus of claim 27, wherein the slots are ordered in descending slot priority levels from the initial slot of the window associated with a highest slot priority level to a last slot of the window associated with a lowest slot priority level.

* * * * *